United States Patent
Ohara et al.

(10) Patent No.: US 11,359,041 B2
(45) Date of Patent: Jun. 14, 2022

(54) ENDLESS BELT, HEAT-SEALING DEVICE, FIXING DEVICE, AND ARTICLE TRANSFER DEVICE

(71) Applicant: FUJIFILM Business Innovation Corp., Tokyo (JP)

(72) Inventors: Hideaki Ohara, Kanagawa (JP); Kenji Omori, Kanagawa (JP); Junko Yamasaki, Kanagawa (JP); Kenta Yamakoshi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 9 days.

(21) Appl. No.: 16/918,290

(22) Filed: Jul. 1, 2020

(65) Prior Publication Data
US 2021/0301050 A1 Sep. 30, 2021

(30) Foreign Application Priority Data

Mar. 25, 2020 (JP) .............................. JP2020-055031

(51) Int. Cl.
| | | |
|---|---|---|
| C08F 214/26 | (2006.01) | |
| B65G 15/32 | (2006.01) | |
| G03G 15/20 | (2006.01) | |
| C08G 65/00 | (2006.01) | |
| B65G 15/00 | (2006.01) | |

(52) U.S. Cl.
CPC .......... *C08F 214/262* (2013.01); *B65G 15/00* (2013.01); *B65G 15/32* (2013.01); *C08G 65/007* (2013.01); *G03G 15/2057* (2013.01); *G03G 2215/2016* (2013.01)

(58) Field of Classification Search
None
See application file for complete search history.

(56) References Cited

U.S. PATENT DOCUMENTS

| | | | | |
|---|---|---|---|---|
| 2010/0285262 A1* | 11/2010 | Ikeda | ..................... | A47J 36/025 428/64.1 |
| 2011/0159276 A1* | 6/2011 | Chen | .................. | G03G 15/2057 428/336 |
| 2014/0109641 A1* | 4/2014 | Ikeda | ..................... | B23P 13/00 72/46 |
| 2014/0341621 A1* | 11/2014 | Omori | ................ | G03G 15/2028 399/329 |
| 2014/0341622 A1* | 11/2014 | Okabayashi | ....... | G03G 15/2028 399/329 |
| 2016/0195838 A1* | 7/2016 | Matsunaka | ........ | G03G 15/2057 399/333 |
| 2019/0077928 A1* | 3/2019 | Kuwajima | .............. | B32B 27/32 |

FOREIGN PATENT DOCUMENTS

| | | | |
|---|---|---|---|
| JP | 2007-114373 A | | 5/2007 |
| JP | 4186447 B2 | * | 11/2008 |
| JP | 2015087432 A | * | 5/2015 |
| JP | 2016183299 A | * | 10/2016 |
| JP | 2018-185007 A | | 11/2018 |

* cited by examiner

*Primary Examiner* — Nicole M. Buie-Hatcher
(74) *Attorney, Agent, or Firm* — Sughrue Mion, PLLC (57) ABSTRACT

An endless belt includes a substrate layer, and a first surface layer that is disposed on an outer circumferential surface of the substrate layer and that includes a cross-linked fluororesin layer. A layer containing a cross-linked fluororesin forms the inner circumferential surface of the belt. Martens hardness of the inner circumferential surface of the belt at 130° C. is higher than Martens hardness of the outer circumferential surface of the belt at 130° C.

18 Claims, 4 Drawing Sheets

ENDLESS BELT, HEAT-SEALING DEVICE, FIXING DEVICE, AND ARTICLE TRANSFER DEVICE

CROSS-REFERENCE TO RELATED APPLICATIONS

This application is based on and claims priority under 35 USC 119 from Japanese Patent Application No. 2020-055031 filed Mar. 25, 2020.

BACKGROUND

(i) Technical Field

The present disclosure relates to an endless belt, a heat-sealing device, a fixing device, and an article transfer device.

(ii) Related Art

Japanese Unexamined Patent Application Publication No. 2018-185007 discloses a sliding component including a substrate and a fluororesin layer in which a fluororesin is the main component. The fluororesin layer includes a compatibility layer having a low cross-linking degree.

SUMMARY

An endless belt used for a device that transfers an article to be heated while heating the article is required to have abrasion resistance and follow irregularities of the article to be heated.

Aspects of non-limiting embodiments of the present disclosure relate to providing an endless belt including a substrate layer and a first surface layer that is disposed on the outer circumferential surface of the substrate layer and that consists of a cross-linked fluororesin layer, and a cross-linked fluororesin layer forms the inner circumferential surface of the belt. Such an endless belt has higher abrasion resistance of the inner and outer circumferential surfaces and higher followability to irregularities than an endless belt in which the inner circumferential surface has a lower Martens hardness than the outer circumferential surface at 130° C.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an endless belt including a substrate layer and a first surface layer that is disposed on the outer circumferential surface of the substrate layer and that consists of a layer containing a cross-linked fluororesin. A layer containing a cross-linked fluororesin forms the inner circumferential surface of the belt. Martens hardness of the inner circumferential surface of the belt at 130° C. is higher than Martens hardness of the outer circumferential surface of the belt at 130° C.

BRIEF DESCRIPTION OF THE DRAWINGS

Exemplary embodiments of the present disclosure will be described in detail based on the following figures, wherein.

DETAILED DESCRIPTION

Hereinafter, the present exemplary embodiments will be described. Such explanation and examples are for description of the exemplary embodiments and do not limit the scope of the exemplary embodiments.

When numerical ranges are described stepwise in the present exemplary embodiments, the upper limit or lower limit values of a numerical range may be replaced with the upper limit or lower limit values of another stepwise numerical range. The upper limit or lower limit values of a numerical range in the present exemplary embodiments may be replaced with a value in examples.

The word "step" in the present exemplary embodiments refers not only to an independent step, but also to a step that is not clearly separable from another step, provided that a predetermined object of the step is achieved.

When an exemplary embodiment is described with reference to the drawings in the present exemplary embodiment, a structure in the exemplary embodiment is not limited to the structure in the drawings. The size of members in the drawings is schematic, and thus the relative relationship of the sizes of the members is not limited to that in the drawings.

In the present exemplary embodiments, a composition may contain plural types of substances corresponding to a constituent. In the present exemplary embodiments, when a composition contains plural types of substances corresponding to a constituent of the composition, the amount of constituent in the composition refers to the total amount of plural types of the substances in the composition, unless stated otherwise.

Endless Belt

An endless belt according to the present exemplary embodiment includes a substrate layer and a first surface layer that is disposed on the outer circumferential surface of the substrate layer and that consists of a cross-linked fluororesin layer. A layer containing a cross-linked fluororesin forms the inner circumferential surface of the belt. Martens hardness of the inner circumferential surface of the belt at 130 C is higher than Martens hardness of the outer circumferential surface of the belt at 130 C.

Hereinafter, the Martens hardness of the outer circumferential surface of the belt at 130° C. is also referred to as "HMo (130° C.)", and the Martens hardness of the inner circumferential surface of the belt at 130° C. is also referred to as "HMi (130° C.)".

In the endless belt according to the present exemplary embodiment, a first surface layer disposed on the outer circumferential surface of the substrate layer consists of a cross-linked fluororesin layer. The inner circumferential surface of the belt contains a cross-linked fluororesin, and HMi (130° C.) is higher than HMo (130° C.). Due to such features, the outer circumferential surface and the inner circumferential surface of the belt have high abrasion resistance, and the outer circumferential surface has high followability to irregularities. The reason for this is unclear and presumed to be as follows.

In a device that transfers an article to be heated on an endless belt while heating (e.g., a heat-sealing device, a fixing device, or an article transfer device), while the endless belt is heated, the outer circumferential surface of the belt is in contact with, for example, the article to be heated, and the inner circumferential surface of the belt is slid along another component, such as a heating component.

Thus, when such a device is continuously operated, the outer circumferential surface and the inner circumferential surface of the endless belt may be abraded. If the outer circumferential surface of the endless belt is abraded and becomes rough, the rough surface may cause uneven heating of an article to be heated. If the inner circumferential surface of the endless belt is abraded, abrasive debris of the endless belt may be generated and may increase the rotational load of the endless belt.

If the hardness of the outer circumferential surface and the inner circumferential surface of the endless belt is increased, abrasion is suppressed; however, the followability to irregularities of the endless belt decreases, and the endless belt is less likely to follow the shape of an article to be heated. Thus, the article to be heated may be unevenly heated.

Thus, an endless belt having all the above characteristics to a high extent is required. In particular, in a device that transfers articles to be heated on the endless belt while heating and applying pressure, an endless belt having a hardness of the outer circumferential surface and the inner circumferential surface and followability to irregularities is further required.

In the present exemplary embodiment, a first surface layer disposed on the outer circumferential surface of the substrate layer consists of a cross-linked fluororesin layer. The inner circumferential surface of the belt contains a cross-linked fluororesin, and HMi (130° C.) is higher than HMo (130° C.). The first surface layer consists of a cross-linked fluororesin layer, and thus, the outer circumferential surface of the belt reliably exhibits abrasion resistance. The hardness of the inner circumferential surface of the belt is high when the endless belt is heated during operation of the device, and thus, the inner circumferential surface of the belt, which is slid along another component, also exhibits abrasion resistance. In addition, while the endless belt is heated, the hardness of the outer circumferential surface of the belt is lower than that of the inner circumferential surface. Thus, the outer circumferential surface of the belt is likely to follow the shape of articles to be heated. Therefore, abrasion resistance and followability to irregularities are presumed to be exhibited.

In the present exemplary embodiment, it is presumed that the outer circumferential surface and the inner circumferential surface of the endless belt have abrasion resistance and that the outer circumferential surface has high followability to irregularities, accordingly.

Martens Hardness

Here, Martens hardness is measured by nanoindentation using a nano indentation tester (HM500 manufactured by Fischer Instruments K.K.). Specifically, the Martens hardness of randomly selected three portions of the surface to be measured of a measurement sample is measured with a Berkovich indenter at a specific temperature (130° C. or 25° C.) and a maximum indentation depth of 0.5 μm, and the average of the measurements is determined.

In the present exemplary embodiment, "HMi (130° C.)", Martens hardness of the inner circumferential surface of the belt at 130° C. is higher than "HMo (130° C.)", Martens hardness of the outer circumferential surface of the belt at 130° C.

HMo (130° C.) may be 1 N/mm$^2$ or higher and 16 N/mm$^2$ or lower. To exhibit both abrasion resistance and followability to irregularities, HMo (130° C.) is preferably 2 N/mm$^2$ or higher and 10 N/mm$^2$ or lower and more preferably 4 N/mm$^2$ or higher and 8 N/mm$^2$ or lower.

HMi (130° C.) may be 1 N/mm$^2$ or higher and 16 N/mm$^2$ or lower. To exhibit both abrasion resistance and followability to irregularities, HMi (130° C.) is preferably 4 N/mm$^2$ or higher and 12 N/mm$^2$ or lower and more preferably 6 N/mm$^2$ or higher and 10 N/mm$^2$ or lower.

HMo (130° C.) may be controlled by, for example, selecting the type of the cross-linked fluororesin contained in the first surface layer, changing the ratio of the main constituent and an accessory constituent, which have different types of cross-linked fluororesins, changing the cross-linking degree of the cross-linked fluororesin, or controlling, for example, the time for firing in the process of producing a resin yet to be cross-linked. HMi (130° C.) may be controlled by, for example, selecting the type of the resin contained in the layer forming the inner circumferential surface, adjusting the cross-linked fluororesin content, changing the ratio of the main constituent and an accessory constituent, which have different types of cross-linked fluororesins, changing the crosslinking degree of the cross-linked fluororesin, or controlling, for example, the time for firing in the process of producing a resin yet to be cross-linked.

To exhibit both abrasion resistance and followability to irregularities, the combination of an HMo (130° C.) of 2 N/mm$^2$ or higher and 10 N/mm$^2$ or lower and an HMi (130° C.) of 4 N/mm$^2$ or higher and 12 N/mm$^2$ or lower is preferable, and the combination of an HMo (130° C.) of 4 N/mm$^2$ or higher and 8 N/mm$^2$ or lower and an HMi (130° C.) of 6 N/mm$^2$ or higher and 10 N/mm$^2$ or lower is more preferable.

To exhibit both abrasion resistance and followability to irregularities, the difference between HMo (130° C.) and HMi (130° C.) is preferably 2 N/mm$^2$ or higher and 10 N/mm$^2$ or lower and more preferably 4 N/mm$^2$ or higher and 8 N/mm$^2$ or lower.

In the present exemplary embodiment, Martens hardness of the inner circumferential surface of the belt at 25° C. (hereinafter, also referred to as "HMi (25° C.)") is preferably lower than Martens hardness of the outer circumferential surface of the belt at 25° C. (hereinafter, also referred to as "HMo (25° C.)").

HMi (130° C.) is higher than HMo (130° C.), and HMi (25° C.) is lower than HMo (25° C.). Thus, abrasive resistance and followability to irregularities are both exhibited. In addition, the load applied to the endless belt when the endless belt starts rotating is reduced. The reason for this is unclear and presumed to be as follows. When the device starts operating, the temperature of the endless belt is low, and the hardness of the inner circumferential surface of the belt is relatively low. Thus, the inner circumferential surface of the belt absorbs the load applied when the endless belt starts rotating.

HMo (25° C.) may be 12 N/mm$^2$ or higher and 25 N/mm$^2$ or lower. To exhibit both abrasion resistance and followability to irregularities, HMo (25° C.) is preferably 15 N/mm$^2$ or higher and 23 N/mm² or lower and more preferably 17 N/mm² or higher and 21 N/mm² or lower.

HMi (25° C.) may be 10 N/mm² or higher and 21 N/mm² or lower. To exhibit abrasion resistance and to suppress the load applied when rotation starts, HMi (25° C.) is preferably 13 N/mm² or higher and 19 N/mm² or lower and more preferably 15 N/mm² or higher and 17 N/mm² or lower.

HMo (25° C.) may be controlled by, for example, selecting the type of the cross-linked fluororesin contained in the first surface layer, changing the ratio of the main constituent and an accessory constituent, which have different cross-linked fluororesins, changing the crosslinking degree of the cross-linked fluororesin, or controlling the time for firing in the process of producing a resin yet to be cross-linked. HMi (25° C.) may be controlled by, for example, selecting the type of resin contained in a layer forming the inner circumferential surface, adjusting the cross-linked fluororesin content, changing the ratio of the main constituent and an accessory constituent, which have different types of cross-linked fluororesins, changing the crosslinking degree of the cross-linked fluororesin, or controlling, for example, the time for firing in the process of producing a resin yet to be cross-linked.

To exhibit abrasion resistance and to suppress the load when rotation starts, the combination of an HMo (25° C.) of 15 N/mm² or higher and 23 N/mm² or lower and an HMi (25° C.) of 13 N/mm² or higher and 19 N/mm² or lower is preferable, and the combination of an HMo (25° C.) of 17 N/mm² or higher and 21 N/mm² or lower and an HMi (25° C.) of 15 N/mm² or higher and 17 N/mm² or lower is more preferable.

To exhibit abrasion resistance and to suppress the load applied when rotation starts, the difference between HMo (25° C.) and HMi (25° C.) is preferably 2 N/mm² or higher and 10 N/mm² or lower and more preferably 4 N/mm² or higher and 8 N/mm² or lower.

Layer Structure

Hereinafter, the endless belt according to the present exemplary embodiment will be fully described with reference to the drawings. The same components in the drawings are denoted by the same symbols, and redundant descriptions are thus omitted.

Figure 1:
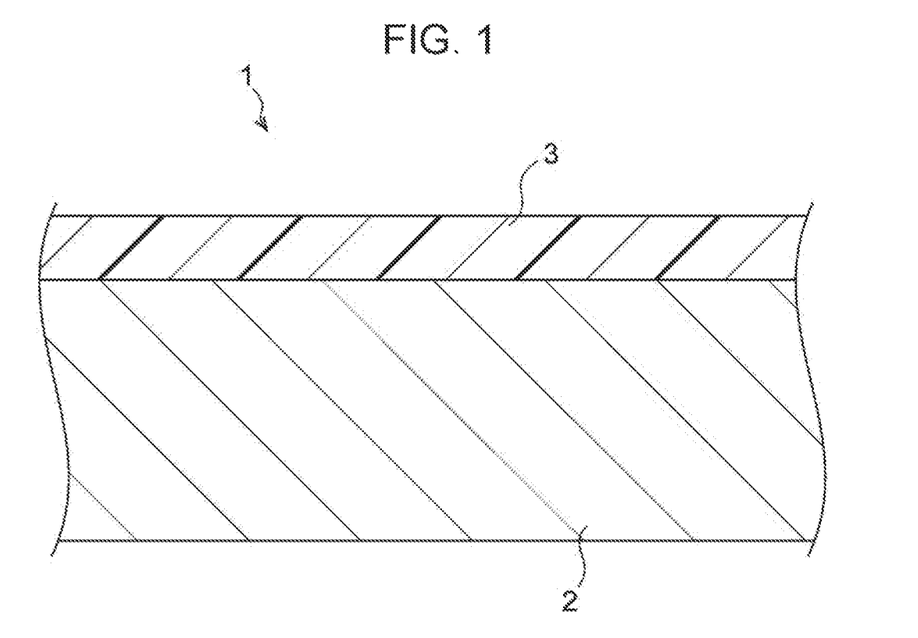
FIG. 1 is a schematic cross sectional view of an exemplary layer structure of an endless belt according to the present exemplary embodiment.
Figure 2:
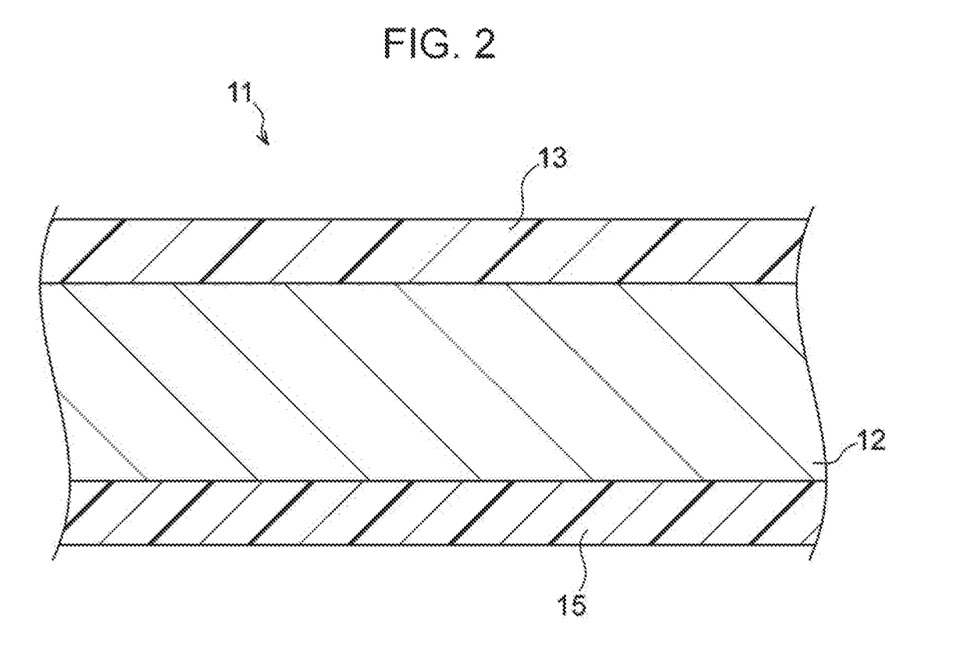
FIG. 2 is a schematic cross sectional view of another exemplary layer structure of the endless belt according to the present exemplary embodiment.

FIG. 1 is a schematic cross sectional view of an exemplary endless belt according to the present exemplary embodiment. FIG. 2 is a schematic cross sectional view of another exemplary endless belt according to the present exemplary embodiment.

An endless belt 1 in FIG. 1 includes a substrate layer 2, which contains cross-linked fluororesin particles, and a first surface layer 3, which is a cross-linked fluororesin layer, sequentially from the inner circumferential surface. The first surface layer 3 is the outermost layer forming the outer circumferential surface of the endless belt 1.

An endless belt 11 in FIG. 2 includes a second surface layer 15, which is a cross-linked fluororesin layer, a substrate layer 12, and a first surface layer 13, which is a cross-linked fluororesin layer, sequentially from the inner circumferential surface. The first surface layer 13 is the outermost layer forming the outer circumferential surface of the endless belt 11.

The endless belt 1 in FIG. 1 and the endless belt 11 in FIG. 2 may each optionally further include another layer. Another layer may be an adhesive layer disposed between the substrate layer and the first surface layer or between the substrate layer and the second surface layer.

Hereinafter, each layer included in the endless belt according to the present exemplary embodiment will be described. Symbols are omitted in the description.

First Surface Layer Forming Outer Circumferential Surface of Belt

The first surface layer is disposed on the outer circumferential surface of the substrate layer and consists of a cross-linked fluororesin layer. The first surface layer is a layer forming the outer circumferential surface of the endless belt (i.e., outermost layer). A layer forming the outer circumferential surface of the belt consists of a cross-linked fluororesin layer, and thus, the outer circumferential surface of the belt has good abrasion resistance, and the articles heated are well separated from the endless belt.

Here, the first surface layer, which is a cross-linked fluororesin layer, contains a cross-linked fluororesin as the main constituent and may optionally contain another constituent, such as an additive. The cross-linked fluororesin content in the first surface layer is preferably 80 mass % or higher, more preferably 90 mass % or higher, and still more preferably 95 mass % or higher.

Cross-Linked Fluororesin

The cross-linked fluororesin may be cross-linked by irradiating an uncross-linked fluororesin with ionizing radiation (e.g., γ-ray, electron beam, X-ray, neutron beam, or high-energy ion beam). Specifically, the cross-linked fluororesin may be cross-linked by irradiating an uncross-linked fluororesin heated to a temperature higher than the crystalline melting point with ionizing radiation at a radiation dose of 1 KGy or higher and 10 MGy or lower without the presence of oxygen.

Examples of the fluororesin include polytetrafluoroethylene resin (hereinafter, also referred to as "PTFE"), perfluoroalkylvinylether-tetrafluoroethylene copolymer resin (hereinafter, also referred to as "PFA"), tetrafluoroethylene-hexafluoropropylene copolymer resin (hereinafter, also referred to as "FEP"), and ethylene-tetrafluoroethylene copolymer resin (hereinafter, also referred to as "ETFE"), and denaturants thereof.

To exhibit both abrasion resistance and followability to irregularities, the cross-linked fluororesin contained in the first surface layer is preferably PFA, PTFE, or FEP and more preferably PFA among such resins.

In the present exemplary embodiment, a layer containing a cross-linked fluororesin forms the inner circumferential surface of the belt, as described above. The type of the cross-linked fluororesin contained in the first surface layer and the type of the cross-linked fluororesin contained in the layer forming the inner circumferential surface of the belt may be the same with each other and preferably differ from each other to set HMi (130° C.) higher than HMo (130° C.)

To exhibit both abrasion resistance and followability to irregularities, the combination of a cross-linked fluororesin contained in the first surface layer and a cross-linked fluororesin contained in the layer forming the inner circumferential surface of the belt is preferably a combination of at least one selected from a group consisting of PFA, PTFE, and FEP and at least one selected from a group consisting of PTFE, FEP, and FEP and more preferably a combination of PFA and PTFE.

The first surface layer may have a thickness of 10 μm or more and 50 μm or less. To keep readily separating articles heated, the thickness is preferably 20 μm or more and 40 μm or less and more preferably 25 μm or more and 35 μm or less.

To keep readily separating articles heated, the thickness of the first surface layer is preferably 11% or higher and 38% or lower of the total thickness of the endless belt, more preferably 20% or higher and 33% or lower, and still more preferably 24% or higher and 30% or lower.

The method for producing the first surface layer may include forming an uncross-linked fluororesin layer on the outer circumferential surface of the substrate layer and thereafter, cross-linking the fluororesin layer by ionizing irradiation to obtain a first surface layer containing a cross-linked fluororesin. The method for producing an uncross-linked fluororesin layer may be a method that includes disposing an uncross-linked fluororesin film (e.g., film, or tube) on the outer circumferential surface of the substrate layer or a method that includes applying a dispersion liquid containing an uncross-linked fluororesin to the outer circumferential surface of the substrate layer and performing drying. The method for applying a dispersion liquid may be a known method. Specific examples of such a method include immersion coating, spray coating, spiral coating (flow coating), blade coating, wire bar coating, bead coating, air knife coating, and curtain coating. The method for applying and drying the dispersion liquid may be centrifugal molding.

Substrate Layer

The material of the substrate layer is not particularly limited. From the viewpoint of the heat resistance and followability of the endless belt, the material of the substrate layer may be a heat-resistant resin.

Examples of the heat-resistant resin include polyimide resins (hereinafter, also referred to as "PI"), polyamideimide resins (hereinafter, also referred to as "PAI"), polybenzimidazole resins (hereinafter, also referred to as "PBI"), polyether ether ketone resins (hereinafter, also referred to as "PEEK"), polysulfone resins (hereinafter, also referred to as "PSU"), polyether sulfone resins (hereinafter, also referred to as "PES"), polyphenylene sulfide resins (hereinafter, also referred to as "PPS"), polyether imide resins (hereinafter, also referred to as "PEI"), wholly aromatic polyester resins, and fluororesins.

Among the above resins, from the viewpoint of mechanical strength and heat resistance, the material of the substrate layer is preferably PI, PAI, PEI, or a fluororesin, more preferably PI or PAI, and still more preferably PI.

From the viewpoint of mechanical strength, the substrate layer may have a thickness of 20 μm or more and 200 μm or less, preferably 30 μm or more and 150 μm or less, and more preferably 40 μm or more and 130 μm or less.

The method for producing the substrate layer may be a method that includes applying a dispersion liquid containing a heat-resistant resin or a precursor of a heat-resistant resin to the outer circumferential surface of the substrate, performing drying, and optionally performing firing to obtain a substrate layer containing a heat-resistant resin. Other examples of the method for obtaining a substrate layer containing a heat-resistant resin include injection molding, extrusion molding, and molding. Specific examples of the method that includes applying a dispersion liquid and the method that includes applying a dispersion liquid and performing drying are the same as those used for producing the first surface layer.

Substrate Layer Forming Inner Circumferential Surface of Belt

When the substrate layer is a layer forming the inner circumferential surface of the belt, the substrate layer contains at least a cross-linked fluororesin. When the substrate layer is a layer forming the inner circumferential surface of the belt, the substrate layer preferably contains the above heat-resistant resin and the above cross-linked fluororesin, and more preferably contains cross-linked fluororesin particles in the above heat-resistant resin.

Specific examples of the cross-linked fluororesin contained in the substrate layer forming the inner circumferential surface of the belt are the same as those of the cross-linked fluororesins contained in the first surface layer. Among such resins, to exhibit both abrasion resistance and followability to irregularities, the cross-linked fluororesin contained in the substrate layer forming the inner circumferential surface of the belt is preferably PTFE, PFA, or FEP and more preferably PTFE.

To exhibit both abrasion resistance and heat resistance, the combination of a heat-resistant resin and a cross-linked fluororesin is preferably a combination of at least one selected from a group consisting of PI and PAI and at least one selected from a group consisting of PTFE, PFA, and FEP and more preferably a combination of PI and PTFE.

When the substrate layer is a layer forming the inner circumferential surface of the belt, the cross-linked fluororesin content in the substrate layer may be 5 mass % or higher and 60 mass % or lower. From the viewpoint of abrasion resistance, heat resistance, and the mechanical strength of the substrate, the cross-linked fluororesin content is preferably 10 mass % or higher and 40 mass % or lower and more preferably 15 mass % or higher and 25 mass % or lower.

When the substrate layer is a layer containing cross-linked fluororesin particles in the heat-resistant resin, the cross-linked fluororesin particles may have a number average particle size of 0.05 μm or more and 1 μm or less. From the viewpoint of abrasion resistance, heat resistance, and the mechanical strength of the substrate, the number average particle size is preferably 0.07 μm or more and 0.5 μm or less and more preferably 0.1 μm or more and 0.3 μm or less.

The number average particle size of cross-linked fluororesin particles is measured by the following method.

First, a layer containing cross-linked fluororesin particles is cut to prepare a specimen. The cross section of the specimen is observed under a scanning electron microscope (SEM) at ×5000 magnification or higher. The maximum size of 50 cross-linked fluororesin particles in a primary particle state is measured. The average of the maximum sizes of 50 cross-linked fluororesin particles in a primary particle state is calculated and regarded as the above-described number average particle size. The SEM used is JSM-6700F manufactured by JEOL Ltd. The secondary electron image obtained at an acceleration voltage of 5 kV is observed.

The substrate layer containing cross-linked fluororesin particles in the heat-resistant resin may be formed by using fluororesin particles which have been cross-linked in advance before forming the substrate layer or by forming a substrate layer containing uncross-linked fluororesin particles and cross-linking the uncross-linked fluororesin particles by ionizing irradiation. The method for forming a substrate layer containing cross-linked fluororesin particles in the heat-resistant resin may be a method that includes applying a dispersion liquid containing a heat-resistant resin or a precursor of a heat-resistant resin and fluororesin particles that has been cross-linked beforehand to the outer circumferential surface of a substrate, drying the coating, and optionally performing firing to obtain a substrate layer containing the cross-linked fluororesin and the heat-resistant resin; a method that includes applying a dispersion liquid containing a heat-resistant resin or a precursor of a heat-resistant resin and uncross-linked fluororesin particles to the outer circumferential surface of a substrate, drying the coating, optionally performing firing to obtain a substrate layer containing the uncross-linked fluororesin and the heat-resistant resin, and performing ionizing irradiation; a method that includes mixing a heat-resistant resin with fluororesin particles that has been cross-linked beforehand by, for example, kneading, molding the mixture to obtain a substrate layer containing a cross-linked fluororesin and the heat-resistant resin; or a method that includes mixing a heat-resistant resin with uncross-linked fluororesin particles by, for example, kneading, molding the mixture to obtain a substrate layer containing an uncross-linked fluororesin and the heat-resistant resin, and performing ionizing irradiation.

Second Surface Layer Forming Inner Circumferential Surface of Belt

When the substrate layer is not a layer forming the inner circumferential surface of the belt, the endless belt has a second surface layer on the inner circumferential surface of the substrate layer. The second surface layer is a layer forming the inner circumferential surface of the belt (i.e., innermost layer). The second surface layer contains at least a cross-linked fluororesin and is preferably a cross-linked fluororesin layer.

Here, the second surface layer, which is a cross-linked fluororesin layer, contains a cross-linked fluororesin as the main constituent and may optionally contain another constituent, such as an additive. The cross-linked fluororesin content in the second surface layer is preferably 80 mass % or higher, more preferably 90 mass % or higher, and still more preferably 95 mass % or higher.

Specific examples of the cross-linked fluororesin contained in the second surface layer are the same as those of the cross-linked fluororesin contained in the first surface layer. Among such resins, to exhibit both abrasive resistance and followability to irregularities, the cross-linked fluororesin contained in the second surface layer is preferably PTFE, PFA, or FEP and more preferably PTFE.

The second surface layer may have a thickness of 2 μm or more and 40 μm or less. To maintain the slidability of the endless belt, the thickness is preferably 5 μm or more and 30 μm or less and more preferably 10 μm or more and 20 μm or less.

To maintain the slidability of the endless belt, the thickness of the second surface layer is preferably 1.7% or higher and 27% or lower relative to the total thickness of the endless belt, more preferably 4.3% or higher and 21% or lower, and still more preferably 8% or higher and 15% or lower.

Specific examples of the method that includes applying a dispersion liquid and the method that includes applying a dispersion liquid and performing drying are the same as those used for producing the first surface layer.

Heat-Sealing Device

A heat-sealing device according to the present exemplary embodiment includes a first rotating element, a second rotating element disposed so as to be in contact with the outer surface of the first rotating element, and a pressing member that is disposed inward of the second rotating element and that presses the second rotating element from inward of the second rotating element toward the first rotating element. The second rotating element is the above-described endless belt.

In the heat-sealing device, an article to be heated is heated and pressed in the nip region between the first rotating element and the second rotating element. Specifically, in a case in which an article to be heated is a multilayer body formed by stacking seal portions on each other so as to be in contact with each other, the multilayer body is heated and pressed while passing through the nip region between the first rotating element and the second rotating element in the heat-sealing device, and thus, the sealing portions of the multilayer body are bonded to each other.

A heat source that applies heat to an article to be heated when the article passes through the nip region between the first rotating element and the second rotating element may be disposed inward of the first rotating element, inward of the second rotating element, or outward of the first and second rotating elements, or heat sources may be disposed in plural portions. Another member, such as a pressing member disposed inward of the second rotating element, may function as a heat source.

Hereinafter, an exemplary heat-sealing device according to the present exemplary embodiment will be described. The heat-sealing device is not limited thereto.

Figure 3:
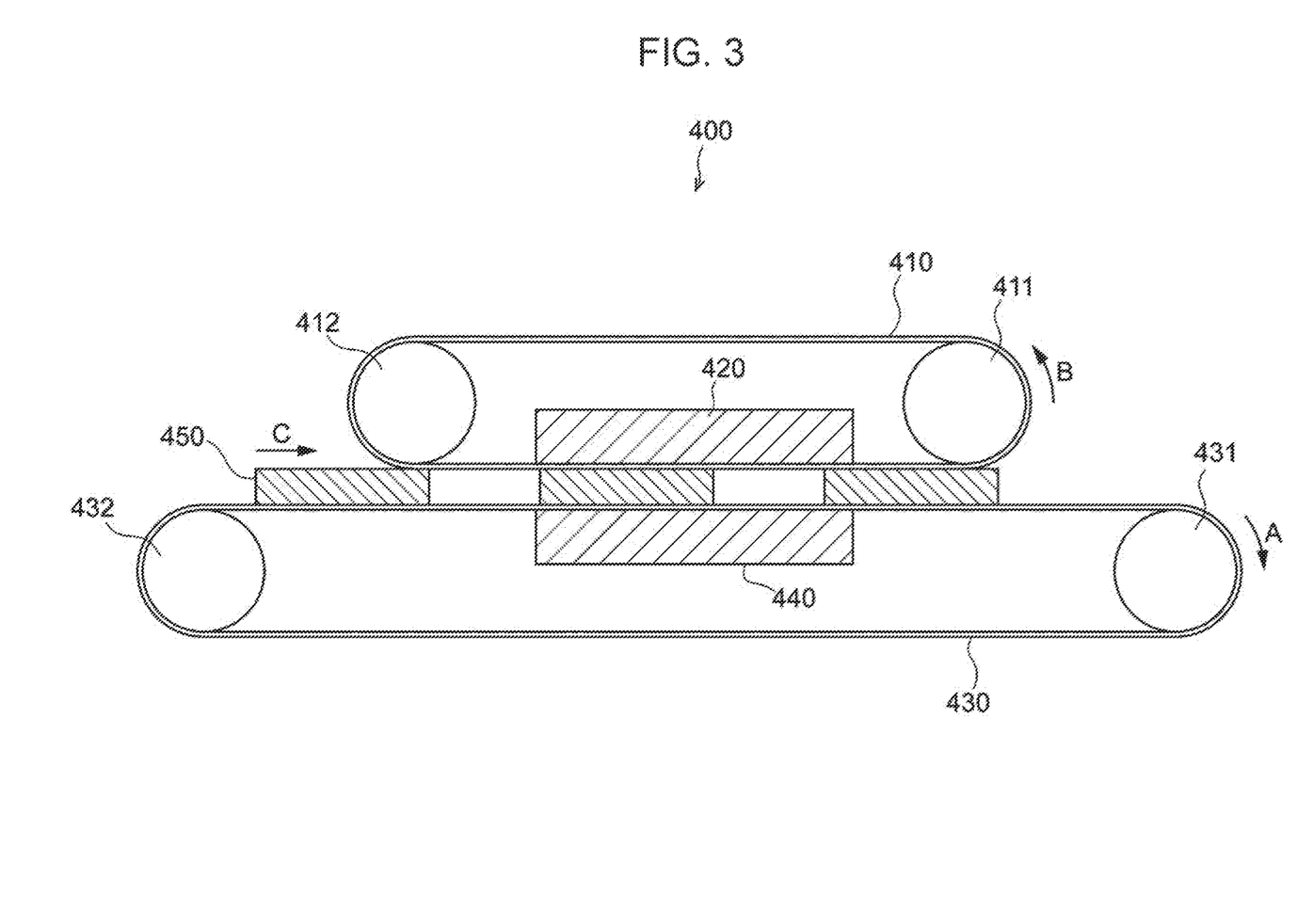
FIG. 3 is a schematic view of an exemplary stricture of a heat-sealing device according to the present exemplary embodiment.

FIG. 3 is a schematic structural view of an exemplary heat-sealing device according to the present exemplary embodiment. FIG. 3 illustrates a heat-sealing device including the above-described endless belt as a seal belt.

A heat sealing device 400 in FIG. 3 includes a seal belt 410, which is an exemplary first rotating element, a seal belt 430, which is the above-described endless belt used as an exemplary second rotating element, and a heater block 440, which is an exemplary pressing member disposed inward of the seal belt 430.

In the heat sealing device 400, the above-described endless belt is used as the seal belt 410, which is the first rotating element, as well as the seal belt 430, and a heater block 420, which functions as a pressing member, is disposed inward of the seal belt 410.

Here, the heater block 420 and the heater block 440 each function as a heat source that applies heat to an article to be heated when the article passes through the nip region between the seal belt 410 and the seal belt 430.

The seal belt 410 is rotatably supported by a driving roll 411, a supporting roll 412, and a heater block 420, which are disposed inward of the seal belt 410. The heater block 420 applies pressure to the seal belt 410 toward the seal belt 430.

In the same manner, the seal belt 430 is rotatably supported by a driving roll 431, a supporting roll 432, and a heater block 440, which are disposed inward of the seal belt 430. The heater block 440 applies pressure to the seal belt 430 toward the seal belt 410.

This forms the nip region between the seal belt 410 and the seal belt 430, in which an article to be heated is nipped between the two belts.

The heater block 420 and the heater block 440 are each a resistance heating element that is an exemplary heat source and provide heat to the nip region. In other words, the heater block 420 is a pressing member and applies pressure to the seal belt 410 from inward of the seal belt 410 toward the nip region, and the heater block 440 is a pressing member and applies pressure to the seal belt 430 from inward of the seal belt 430 toward the nip region. In addition, the heater blocks 420 and 440 function as heat sources that apply heat to an article to be heated passing through the nip region.

In the heat-sealing device 400, the heater block 420 and the heater block 440, which are pressing members, also function as heat sources. The heat source is not necessarily a pressing member and may be a member other than a pressing member. A heat source that is a member other than a pressing member may be a carbon heater that performs heating with radiant heat.

A lubricant applying member not shown is disposed on each of the inner circumferential surfaces of the seal belt 410 and the seal belt 430. The lubricant applying member may be disposed so as to be in contact with the inner circumferential surface of the seal belt and provides an appropriate amount of lubricant to the inner circumferential surface of the seal belt.

Examples of the lubricant include fluorinated oil, silicone oil, and synthetic lubricating oil grease in which a solid material and a liquid are mixed together.

Examples of the fluorinated oil include perfluoropolyether oil and modified perfluoropolyether oil.

Examples of the silicone oil include dimethylsilicone oil, dimethylsilicone oil to which an organic metal salt is added, dimethylsilicone oil to which a hindered amine is added, dimethylsilicone oil to which an organic metal salt and a hindered amine are added, methylphenylsilicone oil, amino-modified silicone oil, amino-modified silicone oil to which an organic metal salt is added, amino-modified silicone oil to which a hindered amine is added, carboxy-modified silicone oil, silanol-modified silicone oil, and sulfonic acid-modified silicone oil.

Examples of the synthetic lubricating oil grease include silicone grease (i.e., grease containing the above silicone oil) and fluorinated grease (i.e., grease containing the above fluorine oil).

From the viewpoint of abrasion resistance of the inner circumferential surface of the belt, the lubricant is preferably a lubricant containing a fluorine atom, more preferably a lubricant containing fluorinated oil (i.e., fluorinated oil or fluorinated grease), and still more preferably a lubricant containing perfluoropolyether oil (i.e., perfluoropolyether oil alone or grease containing perfluoropolyether oil).

In the heat-sealing device 400, a lubricant applying member provides a lubricant to the inner circumferential surface of the seal belt. A lubricant and a lubricant applying member are not necessarily used.

In the heat-sealing device 400, first, the driving roll 431 rotates and drives the seal belt 430 rotationally in direction A. The multilayer body 450, which is an article to be heated, formed by stacking seal portions on each other so as to be in contact with each other is transferred on the seal belt 430 in direction C and led to the nip region. On the other hand, the seal belt 410 is driven to rotate in direction B by the rotation of the driving roll 411.

While being transferred through the nip region by the rotation of the seal belt 410 and the seal belt 430, the multilayer body 450 is heated and pressed by the heater block 420 and the heater block 440, and the sealing portions of the multilayer body 450 are bonded to each other.

Then, the multilayer body 450 in which the seal portions are bonded to each other is further transferred by the rotation of the seal belt 430 and discharged from the nip region.

Fixing Device

A fixing device according to the present exemplary embodiment includes a first rotating element, a second rotating element disposed so as to be in contact with the outer surface of the first rotating element, and a pressing member that is disposed inward of the second rotating element and that presses the second rotating element from inward of the second rotating element toward the first rotating element. The second rotating element is the above-described endless belt.

In the fixing device, an article to be heated may be heated and pressed in the contact portion of the first rotating element and the second rotating element. Specifically, in a case in which a recording medium on which an unfixed toner image is formed is used as an article to be heated, while the recording medium on which an unfixed toner image has been formed is transferred through the contact portion of the first rotating element and the second rotating element in the fixing device, the recording medium is heated and pressed, and the toner image is fixed on the recording medium.

A heat source that applies heat to an article to be heated when the article passes through the contact portion of the first rotating element and the second rotating element may be disposed inward of the first rotating element, inward of the second rotating element, or outward of the first and second rotating elements. Such heat sources may be disposed in plural portions. Another member, such as a pressing member disposed inward of the second rotating element, may function as a heat source.

Hereinafter, an exemplary fixing device according to the present exemplary embodiment will be described. The fixing device is not limited thereto.

Figure 4:
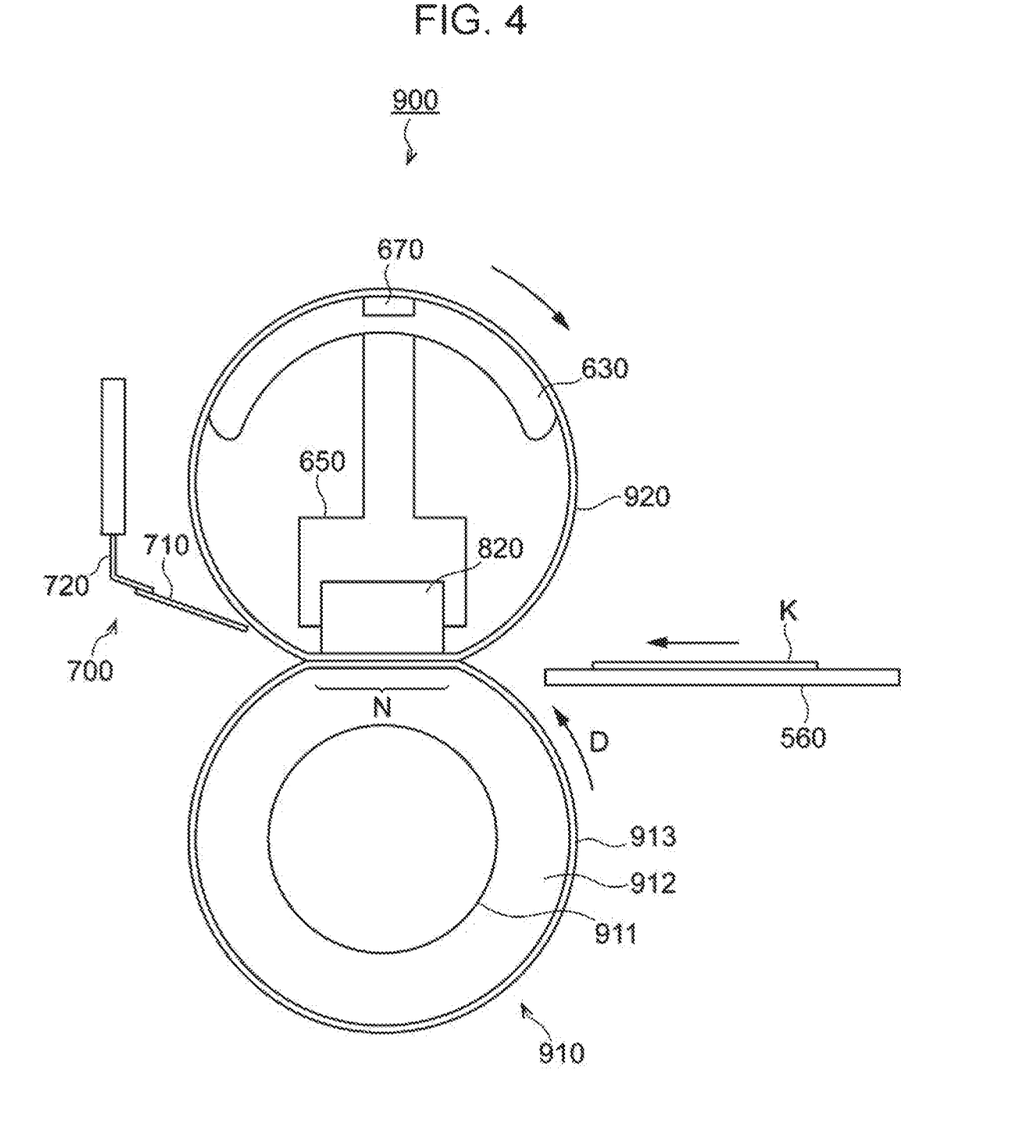
FIG. 4 is a schematic view of an exemplary structure of a fixing device according to the present exemplary embodiment.

FIG. 4 is a schematic structural view of an exemplary fixing device according to the present exemplary embodiment. FIG. 4 illustrates a fixing device including the above-described endless belt as the fixing belt.

A fixing device 900 in FIG. 4 includes a pressing roll 910, which is an exemplary first rotating element, a fixing belt 920, which is the above-described endless belt used as an exemplary second rotating element, and a ceramic heater 820, which is an exemplary pressing member. The ceramic heater 820 also functions as a heat source that applies heat to an article to be heated passing through the contact portion of the pressing roll 910 and the fixing belt 920.

The pressing roll 910 is a rotating element that rotates. The pressing roll 910 is disposed so as to face the fixing belt 920 and is driven to rotate in direction D by a driving motor not shown. Such rotation rotates the fixing belt 920 in a direction opposite to the direction in which the pressing roll 910 rotates.

The pressing roll 910 may include a core (cylindrical core metal) 911, a heat resistant elastic layer 912 covering the outer circumferential surface of the core 911, and further, a release layer 913, which is formed of a heat-resistant resin coating or a heat-resistant rubber coating, stacked on each other. Each layer of the pressing roll 910 is optionally rendered semiconductive by adding, for example, carbon black to address toner offset.

When the paper sheet K is an article to be heated, the fixing belt 920 is disposed near a surface of the paper sheet K that has an unfixed toner image thereon. The paper sheet K is an article to be heated. The fixing belt 920 is rotatably supported by a ceramic heater 820, a belt running guide 630, and an edge guide not shown, which are disposed inward of the fixing belt 920. The fixing belt 920 is in contact with the pressing roll 910 in the nip region N with pressure applied to the fixing belt 920 toward the pressing roll 910. The ceramic heater 820 and the belt running guide 630 are held by a metal holder 650. The belt running guide 630 may be formed of a material having a small static friction coefficient and a low thermal conductivity, such as PFA or PPS.

The ceramic heater 820 is disposed inward of the fixing belt 920 and applies pressure to the pressing roll 910 via the fixing belt 920, and the nip region N is formed between the fixing belt 920 and the pressing roll 910. The ceramic heater 820 may have a flat surface near the pressing roll 910.

The ceramic heater 820 is a resistance heating element that is an exemplary heat source and provides heat to the nip region N. In the fixing device 900, the ceramic heater 820, which is a pressing member, also functions as a heat source. The heat source is not necessarily a pressing member and may be a member other than a pressing member. Such a member other than a pressing member may be a halogen lamp disposed inward of the fixing belt 920 or an electromagnetic induction coil disposed inward or outward of the fixing belt 920.

A lubricant applying member 670 is disposed on the holder 650 in the longitudinal direction of the fixing device 900. The lubricant applying member 670 is disposed so as to be in contact with the inner circumferential surface of the fixing belt 920 and provides an appropriate amount of lubricant to the inner circumferential surface of the fixing belt 920.

Specific and preferable examples of the lubricant are the same as those of the lubricant used for the above-described heat-sealing device.

In the fixing device 900, the lubricant applying member 670 provides the lubricant to the inner circumferential surface of the fixing belt 920. A lubricant and a lubricant applying member are not necessarily used.

In the fixing device 900, a peeling member 700, as a peeling auxiliary unit, is disposed downstream of the nip region N in the rotating direction of the fixing belt 920. Regarding the peeling member 700, a holder 720 holds a peeling baffle 710 such that the peeling baffle 710 is adjacent to the fixing belt 920 in a direction opposite to the rotational direction of the fixing belt (counter direction).

In the fixing device 900, first, the paper sheet K having an unfixed toner image thereon, which is an article to be heated, is led by a fixing entrance guide 560 and transferred to the nip region N. The paper sheet K that has been transferred to the nip region N is transferred by the rotation of the pressing roll 910 and the fixing belt 920 and passes through the nip region N. While the paper sheet K is passing through the nip region N, the toner image on the paper sheet K is fixed by the pressure applied to the nip region N and heat provided from the ceramic heater 820.

The paper sheet K that has passed through the nip region N is peeled off from the fixing belt 920 in the exit region of the nip region N (peeling nip portion) due to a change in the curvature of the fixing belt 920.

Article Transfer Device

An article transfer device according to the present exemplary embodiment includes an article transfer belt consisting of the above-described endless belt and a heat source that applies heat to an article to be heated transferred by the article transfer belt.

In the article transfer device, a product that is an article to be heated is heated by a heat source while being transferred by the article transfer belt. The product that is an article to be heated is not particularly limited and may be food or an electronic component.

A heat source that applies heat to an article to be heated transferred by the article transfer belt may be disposed inward or outward of the article transfer belt. Such heat sources may be disposed in plural portions.

The article transfer device may apply heat to an article to be heated transferred by the article transfer belt, while applying pressure.

Hereinafter, an exemplary article transfer device according to the present exemplary embodiment will be described. The article transfer device is not limited thereto.

Figure 5:
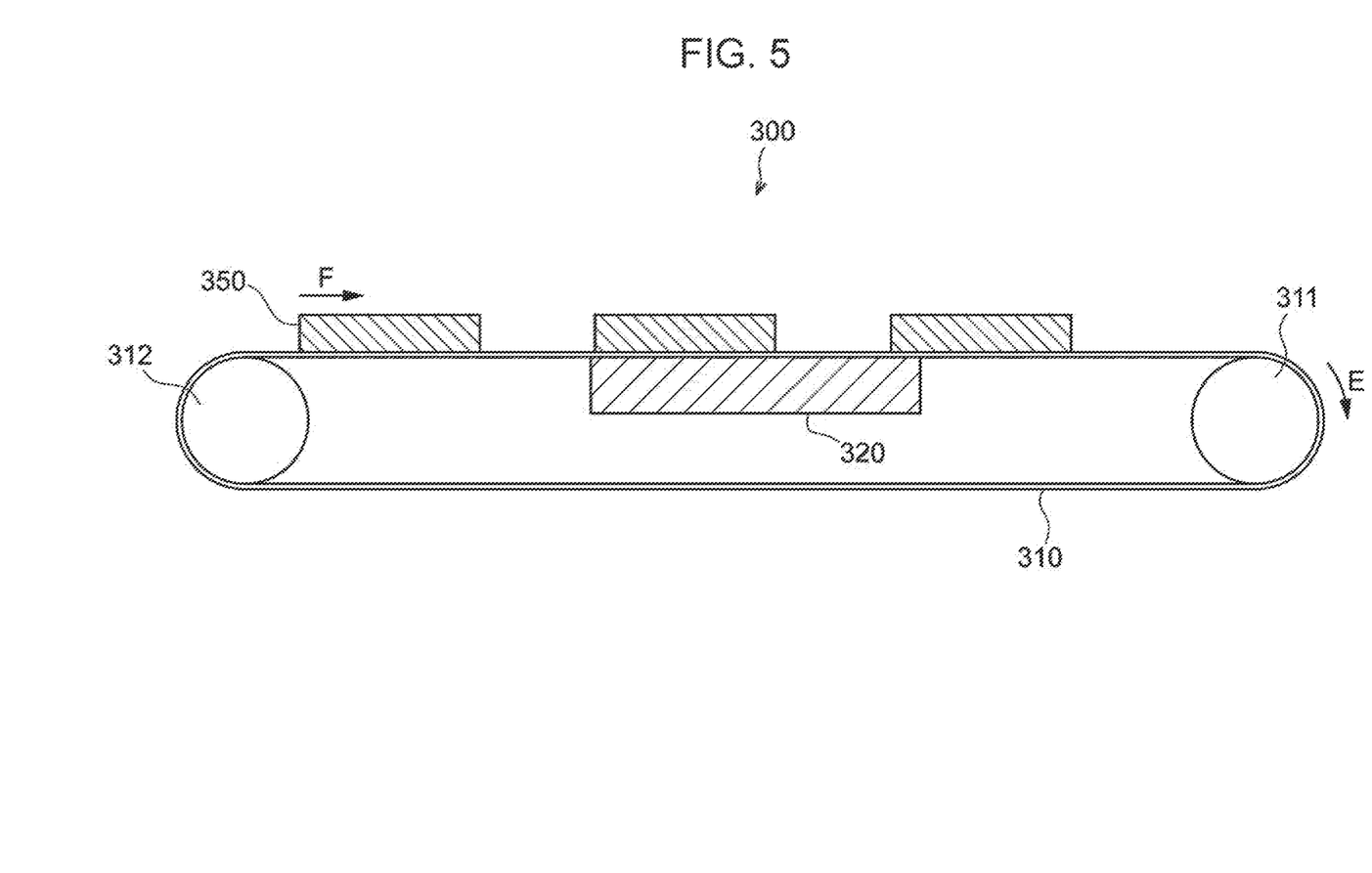
FIG. 5 is a schematic view of an exemplary structure of an article transfer device according to the present exemplary embodiment.

FIG. 5 is a schematic structural view of an exemplary article transfer device according to the present exemplary embodiment. FIG. 5 is a view of an article transfer device including the above-described endless belt as an article transfer belt.

An article transfer device 300 in FIG. 5 includes a transfer belt 310, which is the above-described endless belt used as an exemplary article transfer belt, and a heater block 320, which is an exemplary heat source disposed inward of the transfer belt 310.

The article transfer belt 310 is rotatably supported by a driving roll 311, a supporting roll 312, and a heater block 320, which are disposed inward of the article transfer belt 310.

The heater block 320 is a resistance heating element that is an exemplary heat source and provides heat to the article transfer belt 310.

In the article transfer device 300, the heater block 320 is a heat source. The heat source is not limited thereto and may be a non-contact heat source, such as an infrared heater.

A lubricant applying member not shown is disposed on the inner circumferential surface of the transfer belt 310. The lubricant applying member may be disposed so as to be in contact with the inner circumferential surface of the transfer belt 310 and provides an appropriate amount of lubricant to the inner circumferential surface of the transfer belt 310.

Specific and preferable examples of the lubricant are the same as those of the lubricant used for the above-described heat-sealing device.

In the article transfer device 300, the lubricant applying member provides the lubricant to the inner circumferential surface of the transfer belt 310. A lubricant and a lubricant applying member are not necessarily used.

In the article transfer device 300, first, the driving roll 311 rotates and drives the transfer belt 310 rotationally in direction E. The article 350, which is an article to be heated, is transferred on the transfer belt 310 in direction F to the heating region.

While being transferred through the heating region by the rotation of the transfer belt 310, the article 350 is heated by the heater block 320.

Then, the heated article 350 is transferred by the rotation of the transfer belt 310 and discharged from the heating region.

EXAMPLES

Hereinafter, Examples of the present disclosure will be described. The exemplary embodiments of the disclosure are not limited to the following Examples. In the following description, the unit "part" and "%" are based on mass, unless stated otherwise.

Production of Endless Belt
Production of Endless Belt 1
Production of Substrate Layer 1

A commercially available polyimide precursor liquid (U-Varnish-S, manufactured by Ube Industries, Ltd.) is applied to the surface of a cylindrical stainless steel mold with an outer diameter of 118 mm by immersion to form a coating. Next, the coating is dried at 100° C. for 30 minutes to evaporate the solvent in the coating film and thereafter, fired at 380° C. for 30 minutes to effect imidization to form a polyimide coating with a thickness of 60 µm. The polyimide coating is peeled off from the surface of the stainless steel mold to obtain an endless belt-like heat resistant polyimide substrate having an inner diameter of 118 mm, a thickness of 60 µm, and a length of 370 mm. This substrate is a substrate layer 1.

Formation of Second Surface Layer and First Surface Layer

Centrifugal molding (mold temperature: 200° C., rotational speed: 200 rpm, rotation time: 20 minutes) is performed with a dispersion liquid containing PTFE (PTFE dispersion manufactured by DAIKIN INDUSTRIES, LTD, product name: POLYFLON PTFE-D series) to form an unfired and uncross-linked PTFE layer on the inner circumferential surface of the substrate layer 1. Thereafter, firing is performed in a furnace at 340° C. for 20 minutes to obtain an uncross-linked PTFE layer.

Next, a dispersion liquid containing PFA (PFA dispersion) is applied only to the outer circumferential surface of the substrate layer 1 by immersion coating. The dispersion liquid adhered to the inner circumferential surface of the substrate layer 1 (i.e., on the uncross-linked PTFE layer) is wiped off. Thereafter, firing is performed in a furnace at 380° C. for 30 minutes to obtain an uncross-linked PFA layer.

Then, the uncross-linked PTFE layer and the uncross-linked PFA layer are cross-linked by radiation irradiation performed from the outer-circumferential-surface side of the substrate layer 1 (type of radiation: electron beam, irradiation condition: 50 kGy) in an atmosphere with an oxygen concentration of 1000 ppm or lower while the temperature is adjusted to 280° C.

In such a way, an endless belt 1 is obtained. In the endless belt 1, a second surface layer 1 having a thickness of 15 μm, which is a cross-linked PTFE layer, is disposed on the inner circumferential surface of the substrate layer 1, and a first surface layer 1 having a thickness of 30 μm, which is a cross-linked PFA layer, is disposed on the outer circumferential surface of the substrate layer 1.

Production of Endless Belt 2

Formation of Second Surface Layer and First Surface Layer

Centrifugal molding (mold temperature: 200° C., rotational speed: 200 rpm, rotation time: 20 minutes) is performed with a dispersion liquid containing PTFE (PTFE dispersion manufactured by DAIKIN INDUSTRIES, LTD, product name: POLYFLON PTFE-D series) to form an unfired and uncross-linked PTFE layer on the inner circumferential surface of the substrate layer 1. Thereafter, firing is performed in a furnace at 340° C. for 20 minutes to obtain an uncross-linked PTFE layer.

Next, a dispersion liquid containing PTFE (PTFE dispersion manufactured by DAIKIN INDUSTRIES, LTD, product name: POLYFLON PTFE-D series) is applied only to the outer circumferential surface of the substrate layer 1 by immersion coating. The dispersion liquid adhered to the inner circumferential surface of the substrate layer 1 (i.e., on the uncross-linked PTFE layer) is wiped off. Thereafter, firing is performed in a furnace at 340° C. for 20 minutes to obtain an uncross-linked PTFE layer.

Then, the uncross-linked PTFE layer formed on the inner circumferential surface of the substrate layer 1 and the uncross-linked PTFE layer formed on the outer circumferential surface of the substrate layer are cross-linked by radiation irradiation performed from the outer-circumferential-surface-side of the substrate layer 1 (type of radiation: electron beam, irradiation condition: 50 kGy) in an atmosphere with an oxygen concentration of 1000 ppm or lower while the temperature is adjusted to 300° C.

Since the electron beam irradiation condition is set to 50 kGy as described above, the outer circumferential surface, which is closer to the electron beam source, is more cross-linked than the inner circumferential surface, and the following inequality is satisfied: HMi (130° C.)<HMo (130° C.). HMo (25° C.)<HMi (25° C.) is also satisfied.

In such a way, an endless belt 2 is obtained. In the endless belt 2, a second surface layer 2 having a thickness of 15 μm, which is a cross-linked PTFE layer, is disposed on the inner circumferential surface of the substrate layer 1, and a first surface layer 2 having a thickness of 30 μm, which is a cross-linked PTFE layer having a Martens hardness that differs from Martens hardness of the inner circumferential surface, is disposed on the outer circumferential surface of the substrate layer 1.

Production of Endless Belt 3

Production of Substrate Layer 3

Cross-linked PTFE particles used are obtained as follows. Specifically, cross-linked PTFE particles having a number average particle size of 100 nm are obtained by agglomerating PTFE particles (manufactured by DAIKIN INDUSTRIES, LTD, product name: NEW POLYFLON PTFE M-112) into a mat shape, cross-linking the particles by radiation irradiation (type of radiation: electron beam, irradiation condition: 200 kGy) at 300° C. in an atmosphere with low oxygen concentration, and thereafter, performing cooling to 25° C. and processing with a mill.

Ten parts by mass of the above-described cross-linked PTFE particles having a number average particle size of 100 nm are added to 100 parts by mass of commercially available polyimide precursor liquid (U-Varnish-S manufactured by Ube Industries, Ltd.), and stirring is performed with a beads mill for 60 minutes to obtain a cross-linked PTFE particles dispersion liquid.

The cross-linked PTFE particles dispersion liquid is applied to the surface of a cylindrical stainless steel mold with an outer diameter of 118 mm by immersion to form a coating. Next, the coating is dried at 100° C. for 30 minutes to evaporate the solvent in the coating and thereafter, fired at 380° C. for 30 minutes to effect imidization to form a polyimide coating with a thickness of 60 μm containing cross-linked PTFE particles. The polyimide coating is peeled off from the surface of the stainless steel mold to obtain an endless belt-like heat resistant polyimide substrate having an inner diameter of 118 mm, a thickness of 60 μm, and a length of 370 mm. This substrate is a substrate layer 3 (cross-linked fluororesin particles content: 15 mass %).

Formation of First Surface Layer

A dispersion liquid containing PFA (PFA dispersion) is applied only to the outer circumferential surface of the substrate layer 3 by immersion coating. The dispersion liquid adhered to the inner circumferential surface of the substrate layer 3 is wiped off. Thereafter, firing is performed in a furnace at 380° C. for 30 minutes to obtain an uncross-linked PFA layer.

Then, the uncross-linked PFA layer is cross-linked by radiation irradiation performed from the outer-circumferential-surface side of the substrate layer 3 (type of radiation: electron beam, irradiation condition: 200 kGy) in an atmosphere with an oxygen concentration of 1000 ppm or lower while the temperature is adjusted to 280° C.

In such a way, an endless belt 3 is obtained. In the endless belt 3, a first surface layer 3 having a thickness of 30 μm, which is a cross-linked PFA layer, is disposed on the outer circumferential surface of the substrate layer 3, which contains cross-linked PTFE particles.

Production of Endless Belt 4

Formation of First Surface Layer

A dispersion liquid containing PTFE (PTFE dispersion manufactured by DAIKIN INDUSTRIES, LTD, product name: POLYFLON PTFE-D series) is applied only to the outer circumferential surface of the substrate layer 3 by immersion coating. The dispersion liquid adhered to the inner circumferential surface of the substrate layer 3 is wiped off. Thereafter, firing is performed in a furnace at 340° C. for 20 minutes to obtain an uncross-linked PTFE layer.

Then, the uncross-linked PTFE layer is cross-linked by radiation irradiation from the outer-circumferential-surface side of the substrate layer 3 (type of radiation: electron beam, irradiation condition: 200 kGy) in an atmosphere with an oxygen concentration of 1000 ppm or lower while the temperature is adjusted to 300° C.

In such a way, an endless belt 4 is obtained. In the endless belt 4, a first surface layer 4 having a thickness of 30 μm, which is a cross-linked PTFE layer, is disposed on the outer circumferential surface of the substrate layer 3, which contains cross-linked PTFE particles.

Production of Endless Belt C1

Formation of First Surface Layer

A dispersion liquid containing PFA (PFA dispersion) is applied only to the outer circumferential surface of the substrate layer 1 by immersion coating. The dispersion liquid adhered to the inner circumferential surface of the substrate layer 1 is wiped off. Thereafter, firing is performed in a furnace at 380° C. for 30 minutes to obtain an uncross-linked PFA layer.

In such a way, an endless belt C1 is obtained. In the endless belt C1, a first surface layer C1 having a thickness of 30 μm, which is an uncross-linked PFA layer, is disposed on the outer circumferential surface of the substrate layer 1.

Production of Endless Belt C2

Formation of Second Surface Layer and First Surface Layer

Centrifugal molding (mold temperature: 200° C., rotational speed: 200 rpm, rotation time: 20 minutes) is performed with a dispersion liquid containing PTFE (PTFE dispersion manufactured by DAIKIN INDUSTRIES, LTD, product name: POLYFLON PTFE-D series) to form an unfired and uncross-linked PTFE layer on the inner circumferential surface of the substrate layer 1. Thereafter, firing is performed in a furnace at 340° C. for 20 minutes to obtain an uncross-linked PTFE layer.

Next, a dispersion liquid containing PFA (PFA dispersion) is applied only to the outer circumferential surface of the substrate layer 1 by immersion coating. The dispersion liquid adhered to the inner circumferential surface of the substrate layer 1 (i.e., on the uncross-linked PTFE layer) is wiped off. Thereafter, firing is performed in a furnace at 380° C. for 30 minutes to obtain an uncross-linked PFA layer.

In such a way, an endless belt C2 is obtained. In the endless belt C2, a second surface layer C2 having a thickness of 15 μm, which is an uncross-linked PTFE layer, is disposed on the inner circumferential surface of the substrate layer 1, and a first surface layer C2 having a thickness of 30 μm, which is an uncross-linked PFA layer, is disposed on the outer circumferential surface of the substrate layer 1.

Production of Endless Belt C3 Formation of First Surface Layer

A dispersion liquid containing PFA (PFA dispersion) is applied only to the outer circumferential surface of the substrate layer 3 by immersion coating. The dispersion liquid adhered to the inner circumferential surface of the substrate layer 3 is wiped off. Thereafter, firing is performed in a furnace at 380° C. for 30 minutes to obtain an uncross-linked PFA layer.

In such a way, an endless belt C3 is obtained. In the endless belt C3, a first surface layer C3 having a thickness of 30 μm, which is an uncross-linked PFA layer, is disposed on the outer circumferential surface of the substrate layer 3, which contains cross-linked PTFE particles.

Production of Endless Belt C4

Formation of First Surface Layer

A dispersion liquid containing PFA (PFA dispersion) is applied only to the outer circumferential surface of the substrate layer 1 by immersion coating. The dispersion liquid adhered to the inner circumferential surface of the substrate layer 1 is wiped off. Thereafter, firing is performed in a furnace at 380° C. for 30 minutes to obtain an uncross-linked PFA layer.

Then, the uncross-linked PFA layer is cross-linked by radiation irradiation performed from the outer-circumferential-surface side of the substrate layer 1 (type of radiation: electron beam, irradiation condition: 200 kGy) in an atmosphere with an oxygen concentration of 1000 ppm or lower while the temperature is adjusted to 280° C.

In such a way, an endless belt C4 is obtained. In the endless belt C4, a first surface layer C4 having a thickness of 30 μm, which is a cross-linked PFA layer, is disposed on the outer circumferential surface of the substrate layer 1.

Measurement of Martens Hardness of Endless Belt

Regarding the obtained endless belt, Martens hardness of the outer circumferential surface of the belt at 130° C., "HMo (130° C.)", Martens hardness of the inner circumferential surface of the belt at 130° C., "HMi (130° C.)", Martens hardness of the outer circumferential surface of the belt at 25° C., "HMo (25° C.)", and Martens hardness of the inner circumferential surface of the belt at 25° C., "HMi (25° C.)", are measured by the above-described method. The results are summarized in Table 1 and Table 2. The unit of HMo (130° C.), HMi (130° C.), HMo (25° C.), and HMi (25° C.) in Table 1 and Table 2 is "N/mm²".

Evaluation of Endless Belt

The obtained endless belt is used as the seal belt 430 of the heat-sealing device in FIG. 3.

A lubricant is used for the inner circumferential surface of the seal belt 430. The lubricant in Examples and Comparative Examples other than Example 5 is perfluoropolyether oil, which is fluorinated oil. The lubricant in Example 5 is silicone oil (product name: KF968-100CS, manufactured by Shin-Etsu Chemical Co., Ltd.).

As an article to be heated that is a multilayer body formed by stacking seal portions on each other, a multilayer body including a paper piece having a thickness of 100 μm and a size of 10 cm×10 cm between laminate films (manufactured by GOYO PAPER WORKING CO., LTD., total thickness: 105 μm) is used. The bonding operation of the seal portions of the multilayer bodies is performed 500,000 times in sequence (temperature: 150° C., pressure: 0.2 MPa, transfer speed: 200 mm/s).

Evaluation of Change in Torque Over Time

The torque applied to the driving roll 431 is measured, and the increase in torque over time (i.e., increase in rotational load) is evaluated. A smaller increase in torque indicates higher abrasion resistance of the inner circumferential surface of the belt. The reason for an increase in torque over time is unclear. It is presumed that abrasion debris generated by abrasion of the inner circumferential surface of the seal belt 430 may cause such an increase. The evaluation standards are as follows. The evaluation results are summarized in Table 1 and Table 2. In the description about the following standards, Ti denotes initial torque, and Te denotes torque measured after a 500,000th bonding operation of the sealing portions is performed.

G1: Te<1.2Ti
G2: 1.2Ti≤Te<1.5Ti
G3: 1.5Ti≤Te<1.7Ti
G4: 1.7Ti≤Te<2Ti
G5: 2Ti≤Te

Evaluation of Surface Roughness of Article Heated

The surface roughness of the multilayer body, to which a 500,000th bonding operation has been performed, is measured with a surface texture measuring apparatus (manufactured by TOKYO SEIMITSU CO., LTD., product name: SURFCOM NEX100), and evaluation of the surface roughness of the article is performed. Less surface roughness indicates higher abrasion resistance of the outer circumferential surface of the belt. The reason for the occurrence of the surface roughness of an article heated is unclear. It is presumed that the outer circumferential surface of the seal belt 430 is abraded, becomes rough, and causes uneven heating of an article to be heated, thereby causing the surface roughness. The evaluation standards are as follows. The evaluation results are summarized in Table 1 and Table 2. In the description about the following standards, Ri denotes the surface roughness of the first article to be heated, and Re denotes the surface roughness of an article heated to which a 500,000th bonding operation has performed.

G1: Re<1.2Ri
G2: 1.2Ri≤Re<1.5Ri
G3: 1.5Ri≤Re<1.7Ri
G4: 1.7Ri≤Re<2Ri
G5: 2Ri≤Re

Evaluation of Adhesion Failure of Article Heated

The adhesion strength of the seal portions of a multilayer body to which a 500,000th boding operation has been performed is measured with a digital force gauge (manufactured by IMADA CO., LTD., product series: ZTS series), and adhesion failure is evaluated. The absence or lower occurrence of adhesion failure indicates that the seal belt 430 follows irregularities better. The reason for the adhesion failure is unclear. It is presumed that the outer circumferential surface of the seal belt 430 becomes unlikely to follow the irregularities of an article to be heated and uneven heating is caused, thereby causing adhesion failure. The evaluation standards are described as follows. The evaluation results are summarized in Table 1 and Table 2. In the description about the following standards, Sb denotes the adhesion strength of the multilayer portions of articles heated to which a 500,000th bonding operation has been performed (i.e., seal portions of the multilayer body) in Examples 2 and 4. The adhesion strength of articles heated to which a 500,000th bonding operation has been performed in Examples 2 and 4 is the highest among those in Examples and Comparative Examples in this description. Se denotes the adhesion strength of the multilayer portion of an article heated to which a 500,000th bonding operation has been performed in corresponding Example.

G1: 0.8Sb<Se≤Sb
G2: 0.6Sb<Se≤0.8Sb
G3: 0.4Sb<Se≤0.6Sb
G4: 0.2Sb<Se≤0.4Sb
G5: Se≤0.2Sb

TABLE 1

| | | Example 1 | Example 2 | Example 3 | Example 4 | Example 5 |
|---|---|---|---|---|---|---|
| Endless belt | | 1 | 2 | 3 | 4 | 1 |
| First surface layer | | crosslinked PFA | crosslinked PTFE | crosslinked PFA | crosslinked PTFE | crosslinked PFA |
| Substrate layer | Heat-resistant resin | PI | PI | PI | PI | PI |
| | Particles | none | none | crosslinked PTFE | crosslinked PTFE | none |
| Second surface layer | | crosslinked PTFE | crosslinked PTFE | none | none | crosslinked PTFE |
| Lubricant | | fluorinated oil | fluorinated oil | fluorinated oil | fluorinated oil | silicone |
| HMo (130° C.) | | 4 | 6 | 4 | 6 | 4 |
| HMi (130° C.) | | 8 | 8 | 10 | 10 | 8 |
| HMo (25° C.) | | 21 | 18 | 21 | 18 | 21 |
| HMi (25° C.) | | 15 | 15 | 16 | 16 | 15 |
| Evaluation | Torque change over time | G1 | G1 | G1 | G1 | G3 |
| | Surface roughness of article heated | G1 | G1 | G1 | G1 | G3 |
| | Adhesion failure of article heated | G2 | G1 | G2 | G1 | G1 |

TABLE 2

| | | Comparative Example 1 | Comparative Example 2 | Comparative Example 3 | Comparative Example 4 |
|---|---|---|---|---|---|
| Endless belt | | C1 | C2 | C3 | C4 |
| First surface layer | | uncrosslinked PFA | uncrosslinked PFA | uncrosslinked PFA | crosslinked PFA |
| Substrate layer | Heat-resistant resin | PI | PI | PI | PI |
| | Particles | none | none | crosslinked PTFE | none |

TABLE 2-continued

|  | Comparative Example 1 | Comparative Example 2 | Comparative Example 3 | Comparative Example 4 |
|---|---|---|---|---|
| Second surface layer | none | uncrosslinked PTFE | none | none |
| Lubricant | fluorinated oil | fluorinated oil | fluorinated oil | fluorinated oil |
| HMo (130° C.) | 1 | 1 | 1 | 4 |
| HMi (130° C.) | 250 | 2 | 10 | 250 |
| HMo (25° C.) | 12 | 12 | 12 | 21 |
| HMi (25° C.) | 260 | 10 | 16 | 260 |
| Evaluation Torque change over time | G5 | G1 | G1 | G5 |
| Surface roughness of article heated | G5 | G1 | G1 | G5 |
| Adhesion failure of article heated | G4 | G4 | G4 | G1 |

The results in Tables 1 and 2 show that the endless belt according to the present exemplary embodiment suppresses an increase in torque over time, surface roughness of an article heated, and adhesion failure of an article heated more than the endless belts in Comparative Examples. The endless belt according to the present exemplary embodiment exhibits abrasion resistance of the outer and inner circumferential surfaces thereof and followability to irregularities.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An endless belt comprising:
   a substrate layer; and
   a first surface layer that is disposed on an outer circumferential surface of the substrate layer and that consists of a cross-linked fluororesin layer,
   wherein a layer containing a cross-linked fluororesin forms an inner circumferential surface of the belt,
   Martens hardness of the inner circumferential surface of the belt at 130° C. is higher than Martens hardness of an outer circumferential surface of the belt at 130° C., and
   Martens hardness of the inner circumferential surface of the belt at 25° C. is lower than Martens hardness of the outer circumferential surface of the belt at 25° C.

2. The endless belt according to claim 1, wherein Martens hardness of the outer circumferential surface of the belt at 130° C. is 2 N/mm$^2$ or higher and 10 N/mm$^2$ or lower, and Martens hardness of the inner circumferential surface of the belt at 130° C. is 4 N/mm$^2$ or higher and 12 N/mm$^2$ or lower.

3. The endless belt according to claim 2, wherein a difference between Martens hardness of the outer circumferential surface of the belt at 130° C. and Martens hardness of the inner circumferential surface of the belt at 130° C. is 2 N/mm$^2$ or higher and 10 N/mm$^2$ or lower.

4. The endless belt according to claim 3 including a cross-linked fluororesin layer on an inner circumferential surface of the substrate layer, the cross-linked fluororesin layer being the layer containing a cross-linked fluororesin.

5. The endless belt according to claim 3, wherein a difference between Martens hardness of the outer circumferential surface of the belt at 25° C. and Martens hardness of the inner circumferential surface of the belt at 25° C. is 2 N/mm$^2$ or higher and 10 N/mm$^2$ or lower.

6. The endless belt according to claim 2 including a cross-linked fluororesin layer on an inner circumferential surface of the substrate layer, the cross-linked fluororesin layer being the layer containing a cross-linked fluororesin.

7. The endless belt according to claim 1 including a cross-linked fluororesin layer on an inner circumferential surface of the substrate layer, the cross-linked fluororesin layer being the layer containing a cross-linked fluororesin.

8. The endless belt according to claim 1, wherein Martens hardness of the outer circumferential surface of the belt at 25° C. is 15 N/mm$^2$ or higher and 23 N/mm$^2$ or lower, and Martens hardness of the inner circumferential surface of the belt at 25° C. is 13 N/mm$^2$ or higher and 19 N/mm$^2$ or lower.

9. The endless belt according to claim 1, wherein a cross-linked fluororesin contained in the first surface layer is perfluoroalkylvinylether-tetrafluoroethylene copolymer resin, and
   the cross-linked fluororesin contained in the layer forming the inner circumferential surface of the belt is a polytetrafluoroethylene resin.

10. A heat-sealing device comprising:
    a first rotating element;
    a second rotating element that is disposed so as to be in contact with an outer surface of the first rotating element and that consists of the endless belt according to claim 1; and
    a pressing member that is disposed inward of the second rotating element and that applies pressure from inward of the second rotating element to the second rotating element toward the first rotating element.

11. A fixing device comprising:
    a first rotating element;
    a second rotating element that is disposed so as to be in contact with an outer surface of the first rotating element and that consists of the endless belt according to claim 1; and a pressing member that is disposed inward of the second rotating element and that applies pressure from inward of the second rotating element to the second rotating element toward the first rotating element.

12. An article transfer device comprising:
    an article transfer belt consisting of the endless belt according to claim 1; and
    a heat source that heats an article to be heated transferred by the article transfer belt.

13. An endless belt comprising:
    a substrate layer containing cross-linked fluororesin particles; and
    a first surface layer that is disposed on an outer circumferential surface of the substrate layer and that consists of a cross-linked fluororesin layer,
    wherein the substrate forms an inner circumferential surface of the belt,
    Martens hardness of the inner circumferential surface of the belt at 130° C. is higher than Martens hardness of an outer circumferential surface of the belt at 130° C.

14. The endless belt according to claim 13, wherein a difference between Martens hardness of the outer circumferential surface of the belt at 130° C. and Martens hardness of the inner circumferential surface of the belt at 130° C. is 2 N/mm$^2$ or higher and 10 N/mm$^2$ or lower.

15. The endless belt according to claim 13, wherein a difference between Martens hardness of the outer circumferential surface of the belt at 25° C. and Martens hardness of the inner circumferential surface of the belt at 25° C. is 2 N/mm$^2$ or higher and 10 N/mm$^2$ or lower.

16. A heat-sealing device comprising:
    a first rotating element;
    a second rotating element that is disposed so as to be in contact with an outer surface of the first rotating element and that consists of the endless belt according to claim 13; and
    a pressing member that is disposed inward of the second rotating element and that applies pressure from inward of the second rotating element to the second rotating element toward the first rotating element.

17. A fixing device comprising:
    a first rotating element;
    a second rotating element that is disposed so as to be in contact with an outer surface of the first rotating element and that consists of the endless belt according to claim 13; and
    a pressing member that is disposed inward of the second rotating element and that applies pressure from inward of the second rotating element to the second rotating element toward the first rotating element.

18. An article transfer device comprising:
    an article transfer belt consisting of the endless belt according to claim 13; and
    a heat source that heats an article to be heated transferred by the article transfer belt.

* * * * *